US010944246B1

(12) United States Patent
Marsh

(10) Patent No.: US 10,944,246 B1
(45) Date of Patent: Mar. 9, 2021

(54) CABLE MANAGEMENT ASSEMBLY AND GUIDE MEMBER

(71) Applicant: Amazon Technologies, Inc., Seattle, WA (US)

(72) Inventor: Tom Marsh, Kennewick, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 16/169,222

(22) Filed: Oct. 24, 2018

(51) Int. Cl.
*H02G 3/04* (2006.01)
*H02G 3/32* (2006.01)

(52) U.S. Cl.
CPC ......... *H02G 3/0437* (2013.01); *H02G 3/0481* (2013.01); *H02G 3/32* (2013.01)

(58) Field of Classification Search
CPC ...... H02G 3/0437; H02G 3/0481; H02G 3/32; H02G 3/00; H02G 3/02; H02G 3/04; H02G 3/0406; H02G 3/34; H02G 3/36; G02B 6/4452; G02B 6/4478; G02B 6/4471; G02B 6/4477
USPC ..... 174/68.1, 68.3, 135, 72 A, 72 R; 248/56, 248/49, 68.1; 385/134, 135; 52/220.1, 52/220.7
See application file for complete search history.

(56) References Cited

U.S. PATENT DOCUMENTS

| 6,192,181 | B1   | 2/2001  | Haataja et al. |           |
|-----------|------|---------|----------------|-----------|
| 6,263,144 | B1 * | 7/2001  | Daoud          | G02B 6/4457 |
|           |      |         |                | 385/134   |
| 6,586,680 | B1 * | 7/2003  | Nelson         | G02B 6/4478 |
|           |      |         |                | 174/135   |
| 8,263,863 | B2 * | 9/2012  | Young          | H02G 3/0443 |
|           |      |         |                | 174/68.1  |
| 8,502,071 | B2 * | 8/2013  | Caveney        | H02G 3/22 |
|           |      |         |                | 174/68.3  |
| 9,466,959 | B2 * | 10/2016 | Larsen         | H02G 3/045 |
| 9,784,938 | B2 * | 10/2017 | Kellerman      | F16M 13/02 |
| 9,935,446 | B2 * | 4/2018  | Kellerman      | H02G 3/0443 |
| 9,939,102 | B2 * | 4/2018  | Kellerman      | H02G 3/045 |
| 9,958,090 | B2 * | 5/2018  | Kellerman      | H02G 3/045 |

OTHER PUBLICATIONS

Legrand North America, LLC, "Efficiency Meets Exceptional—Cable Management for Data Centers," https://www.legrand.us/markets-solutions/data-center-solutions.aspx (downloaded Sep. 5, 2018).

(Continued)

*Primary Examiner* — Angel R Estrada
(74) *Attorney, Agent, or Firm* — Klarquist Sparkman, LLP

(57) ABSTRACT

A cable management assembly for guiding cable arranged in a tray includes a guide member and a cable manager member. The guide member has a mounting region shaped to receive a portion of a side of the tray to mount the guide member to the tray, and has a contoured guiding surface forming at least part of an outer surface thereof. The contoured guiding surface defines a guide path for cable extending from an interior, over the contoured guiding surface and to an exterior. The cable manager member has a mounting region shaped to fit around at least a portion of the contoured guide surface of the guide member and an extension that extends away from the body. The cable manager member is adjustably mountable along a length of the guide member to position the extension adjacent the guide path.

15 Claims, 5 Drawing Sheets

(56) References Cited

OTHER PUBLICATIONS

Legrand North America, LLC, "Universal Drop Out," https://www.legrand.us/cablofil/cable-tray-wire-mesh/drop-out/udo.aspx (downloaded Sep. 5, 2018).

Legrand North America, LLC, "Wire Mesh Cable Tray Data Center Accessories," https://www.legrand.us/cablofil/wire-mesh-data-center.aspx (downloaded Sep. 5, 2018).

* cited by examiner

US 10,944,246 B1

CABLE MANAGEMENT ASSEMBLY AND GUIDE MEMBER

BACKGROUND

Routing cables requires adherence to certain standards and practices designed to ensure that the cables will perform as intended (e.g., no errors in data transmission occur) and will not be at risk of being damaged or disconnected. As one example, some fiber optic cables are required not to be subject to a bend radius less than ten times or fifteen times the diameter of the cable.

In some environments, such as in data centers, extensive networks of fiber optic cables are arranged in bundles and routed over considerable distances to interconnect network devices. A typical installation can include fiber optic bundles supported along at least portions of their paths by trays, typically extending horizontally. The fiber optic cables must be carefully guided, particularly as the cables are routed through transitions or changes in direction. For example, transitions in the path of a fiber optic cable can occur as it enters or exits a tray, as well as in other situations. Transitions may require guiding cables vertically, including from a lower height to a higher height and/or from a higher height to a lower height, as well as horizontally. Such transitions must be made smoothly so that the fiber optic cables are not routed through a smaller bending radius then allowed. In some applications, a minimum long-term low-stress bending radius is not less than 15 times the diameter of the fiber optic cable. Similar considerations apply to other types of electrical and communications cable, including copper wire cable, in addition to fiber optic cable.

Currently available components for use with cable trays, including components referred to as cable "waterfalls" for the shape in nature that they emulate, are expensive, have fixed physical configurations (e.g., predetermined lengths) not readily adaptable to multiple applications, and may require tools for installation.

DETAILED DESCRIPTION

A cable management assembly such as for use with trays used to guide cable, includes a guide member shaped to fit over an upper edge of the tray and a cable manager member shaped to fit over the guide member. The guide member has a contoured surface for guiding cable between an interior and an exterior of the tray. Variations of the guide member and of the cable manager member are also described. Advantageously, the guide member and/or the cable manager member can have a substantially uniform cross-section so that it can be formed in a cost-effective process (e.g., by extrusion of a plastic material) and in a readily adaptable configuration (e.g., to desired lengths).

Figure 1:
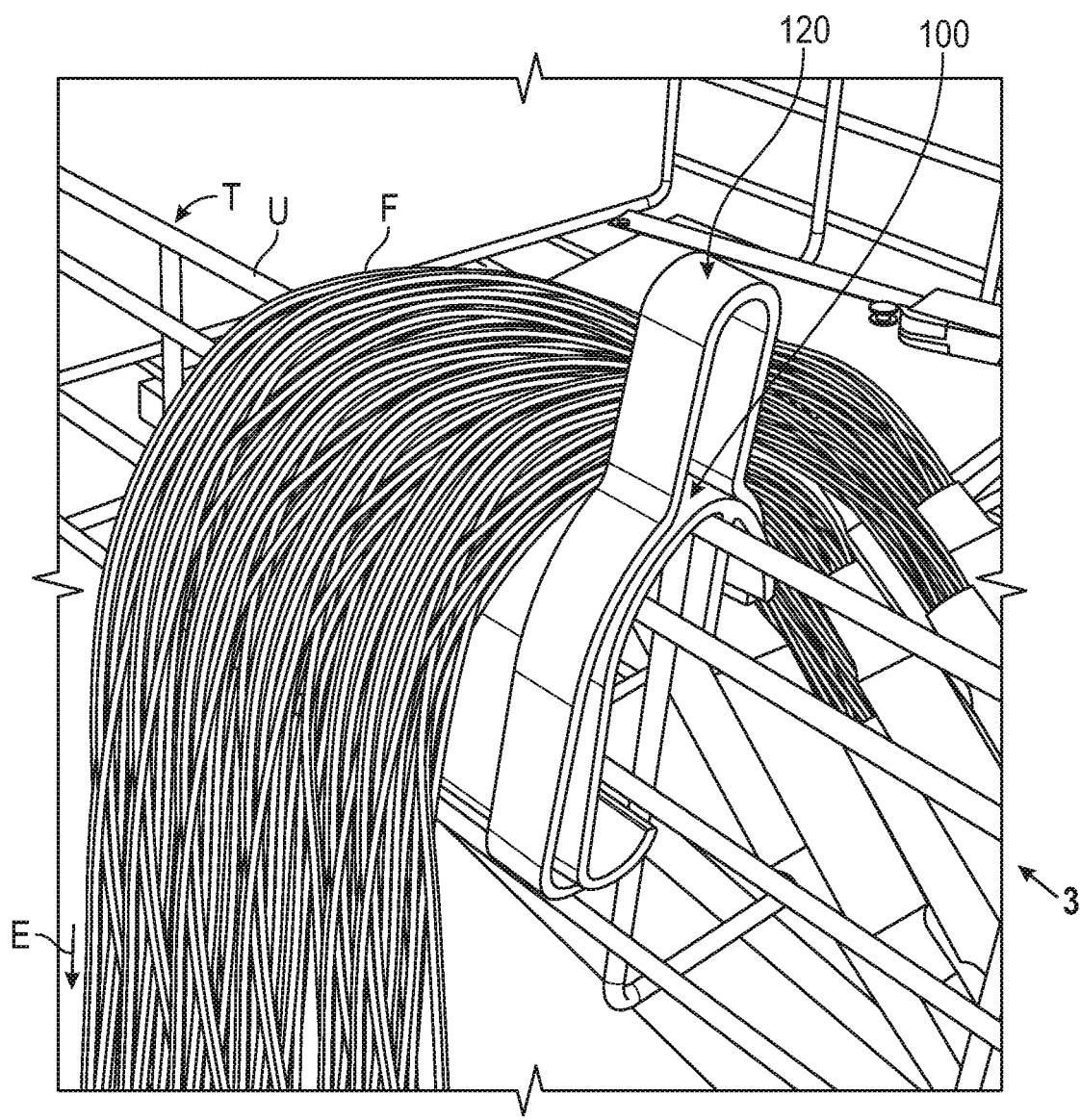
FIG. 1 is a perspective view of a cable management assembly having a guide member and a cable manager member shown in use with a tray.

Referring to FIG. 1, a portion of a conventional wire basket tray T housing cable F in multiple bundles is shown. As shown in the representative example of FIG. 1, the cable F exits the tray T in a direction from right to left, extending from the base of the basket on the right, up to and over an upper railing U or side of the tray T, and then on to another location E at a lower level than the upper railing U. To ensure a smooth transition upon exit of the tray T, the cable F is routed over a guide member 100, which is also referred to herein as a waterfall member. The guide member 100 can be used with one or more optional cable manager members 120, one of which is shown positioned over the guide member 100 at its near end in FIG. 1.

Figure 2:
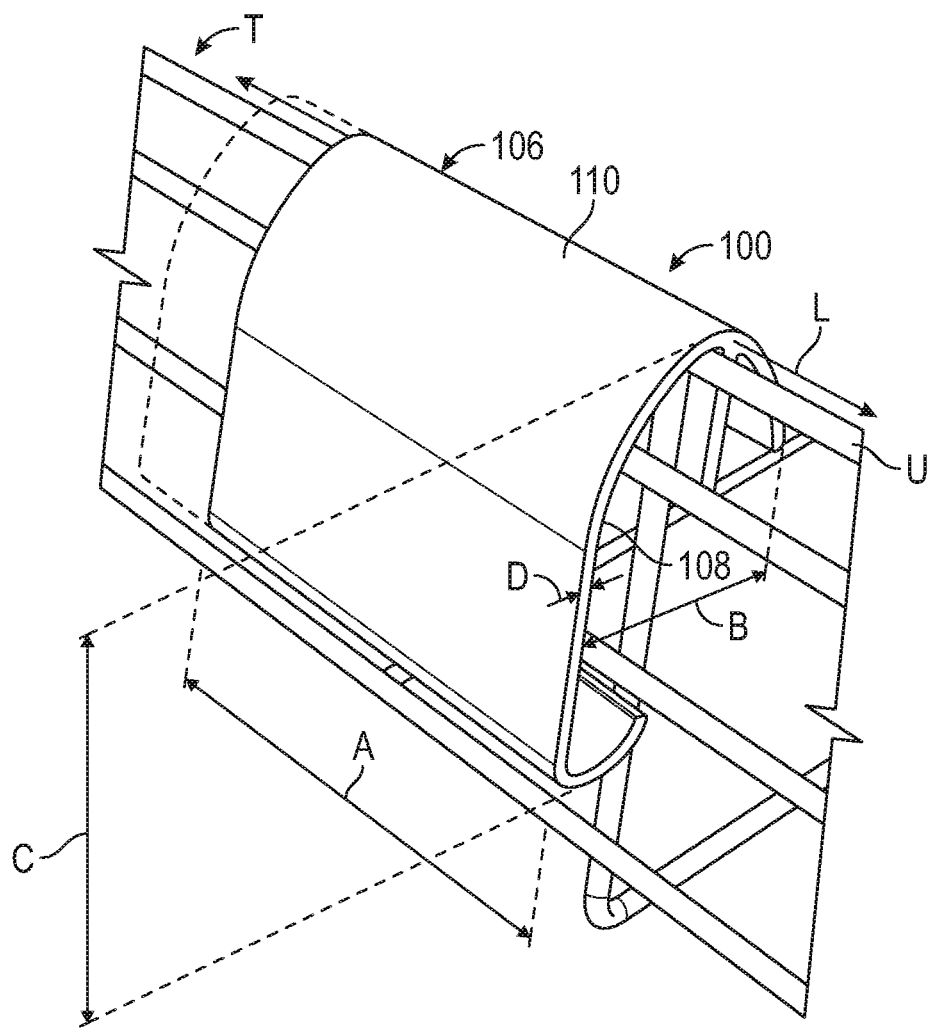
FIG. 2 is another perspective view showing the guide member mounted to the tray.

FIG. 2 is another perspective view showing the guide member 100 mounted to the tray T, but omitting the cable F and the cable manager member 120 for clarity. As shown, the guide member 100 has a length A in the direction of a longitudinal axis L, and a width B measured in a direction perpendicular to the longitudinal axis L. The guide member has a dimension C measured in a direction perpendicular to the axis L and the width B. The dimension C corresponds to a height of the guide member 100 when it is positioned vertically, including when the guide member 100 is mounted on the tray T as shown in FIG. 2. As also shown in FIG. 2, the guide member 100 in the illustrated implementation has at least some portions formed of a substantially uniform thickness D. As indicated by the dashed lines, the guide member 100 can be configured to have any desired length in the direction of the longitudinal axis L, such as may be based on, e.g., operating, manufacturing and/or transportation requirements.

Figure 3:
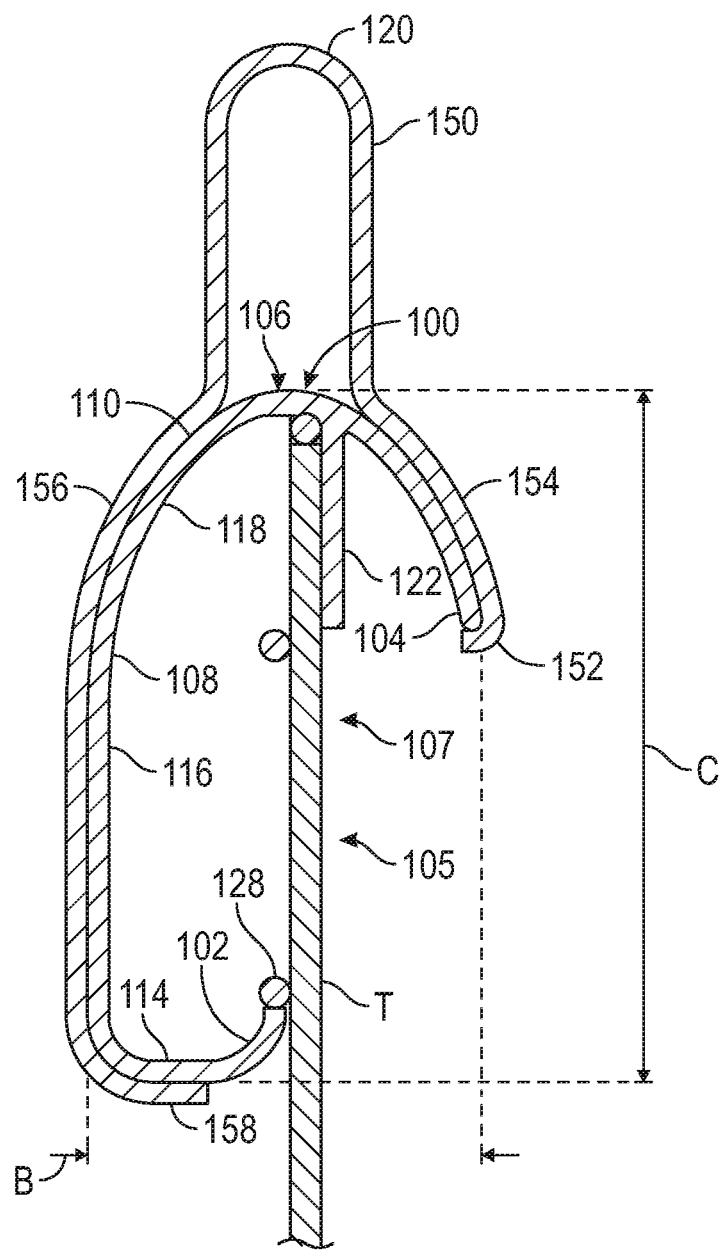
FIG. 3 is a section view in elevation of the guide member and the cable manager member of FIG. 1.

FIG. 3 is a cross-sectional view in elevation showing cross-sections of the guide member 100 and the cable manager member 120 (these cross-sections are also sometimes referred herein to as profiles). As shown in FIGS. 1-3 and discussed in greater detail below, the guide member 100 and/or the cable manager member 120 can have substantially uniform cross-sections over their respective lengths, or at least portions thereof.

Referring to FIGS. 2 and 3, the guide member 100 has a first end or a supported end 102 on its interior side, which is generally designed to rest against another object, e.g., the interior of the tray T as shown. In the illustrated implementation, the supported end 102 can rest against the horizontal rail 128 and/or an adjacent vertical member(s) of the tray T. The guide member 100 has a second end or a free end 104 on its exterior side, which in the illustrated implementation extends away from the tray T. An outer surface 106 of the guide member 100 has at least a portion thereof configured as a contoured guide surface 110 that has a smoothly curving shape for guiding cable appropriately, such as to maintain the allowable minimum radii range to prevent damage to the cable. The contoured portion 110 can be configured as shown to extend from a point within the interior of the tray T to a point on the exterior of the tray T. As best shown in FIG. 2, the contoured guide surface 110 can have an inverted U shape. An inner surface 108 of the guide member 100 is optionally shaped as shown to generally follow the shape of the outer surface 106.

Referring to FIG. 3 to describe the cross-section or profile of the guide member 100 more specifically, it can be seen that the supported end 102 can extend into a curved segment 114 extending generally laterally, which is in turn joined to a segment 116 extending generally uprightly, which in turn is joined to a curved segment 118 extending uprightly and laterally (and having the contoured guide surface 110) that terminates at the free end 104. In the illustrated implementation, the free end 104 is at a level above a level of the supported end 102 when the guide member 100 is in the mounted or installed position as shown. A mounting region 105 is defined on an inner side of the guide member 100 between the supported end 102 and the free end 104, and includes a recess 107 (extending between the ends 102 and 104 and over the length A of the guide member 100) dimensioned to receive a side of the tray T.

Within the mounting region 105, the guide member 100 can have a leg 122 that extends from the inner surface 108 at a point located relative to surrounding structure, such as to contact the upper rail U of the tray T. In the illustrated implementation, the leg 122 is positioned to bear against an outer side (exterior) of the tray T while the inner end 102 bears against an inner side (interior) of the tray T, thereby helping to retain the guide member 100 in place at least in the lateral direction from forces exerted by the cables F, particularly if any of the cables is slid over the guide member 100. In the illustrated implementation, the guide member 100 is form fit to be suspended from the tray T and is mounted without tools, and, in some cases, without requiring any fasteners. In another implementation, the guide member 100 is secured along its length to the tray T or other structure at selected positions, such as by using zip-ties inserted through holes formed in the guide member 100.

Referring again to FIG. 3, the cable manager member 120 has a cross-section or profile that generally follows the shape of the guide member 100, except for an extension 150 that extends away from the guide member 100. Specifically, the cable manager member 120 has, on the exterior side, an outer end 152 that extends into an outer curved segment 154, which is joined to the extension 150. The extension 150 is joined to an inner curved segment 156 on the interior side. The inner curved segment 156 terminates at an inner end 158. As can be seen in FIG. 3, the cable manager member 120 is configured in at least its mounting region to fit closely against the guide member 100, with contact along at least some of the surfaces corresponding to the outer end 152, outer curved segment 154, inner curved segment 156 and inner end 158. The outer end 152 can have a hooked shape as shown to engage the free end 104 of the guide member 100. In some implementations, the cable manager member 120 is formed of a material and in a configuration so that it can be slightly deformed, resiliently, from its relaxed state to fit over the guide member 100 when mounted in the position shown in FIGS. 1 and 3. As a result, when the cable manager member 120 is then relaxed, it exerts a retaining force on the guide member 100 that tends to retain the cable manager member 120 in place.

Referring to FIG. 1, the cable manager member 120 in the illustrated implementation is shorter in length than the guide member 100. The cable manager member 120 is shown positioned at a selected point along the length L of the guide member, such as adjacent a guide path along which the cable F is guided. If desired, multiple cable manager members 120 can be positioned along the length L of the guide member 100, including, e.g., one at each end and/or in pairs to define guide slots therebetween.

Figure 4:
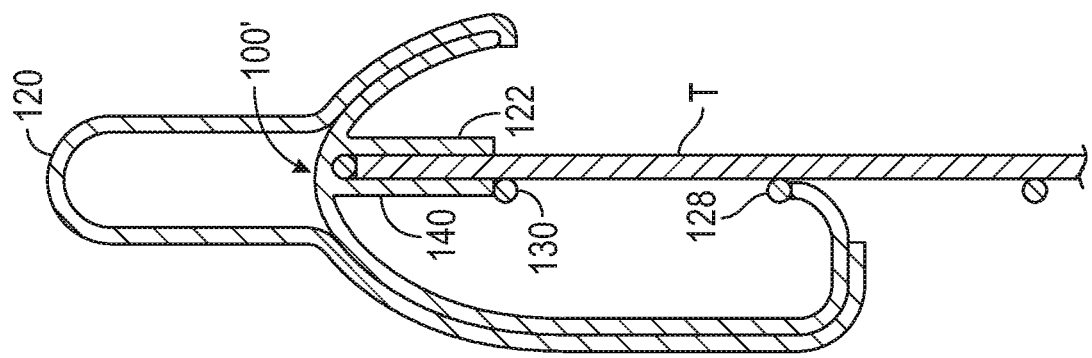
FIG. 4 is a section view in elevation similar to FIG. 3, but showing a second implementation of the guide member.

FIG. 4 is a cross-sectional view in elevation of a slightly modified guide member 100' having a second leg 140 that is spaced apart from the leg 122. A space between the leg 122 and the second leg 140 is defined to receive the side of the tray T. In the illustrated implementation, the second leg 140 can be dimensioned to contact a railing 130 as shown.

Figure 5:
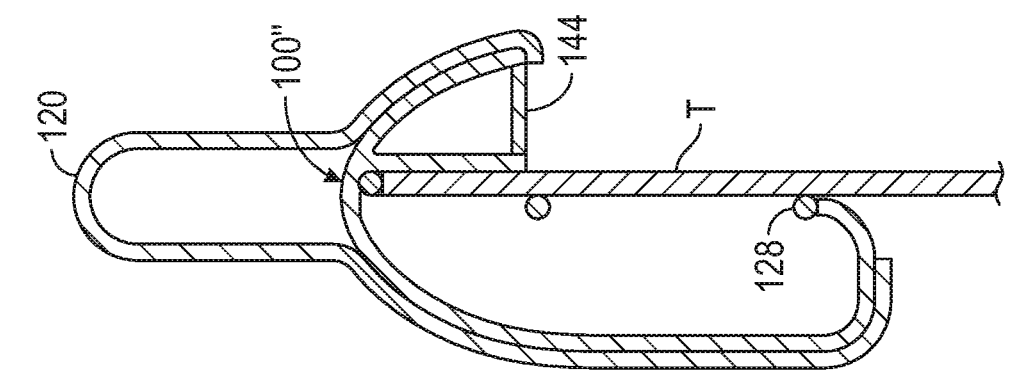
FIG. 5 is a section view in elevation similar to FIG. 3, but showing a third implementation of the guide member.

FIG. 5 is across-sectional view in elevation of another modified guide member 100". The guide member 100" is similar to the guide member 100 described above, except that the guide member 100" has a segment 144 connecting the free end 104 with the free end of the leg 122, thereby enclosing an outer portion of the guide member 110".

Figure 6:
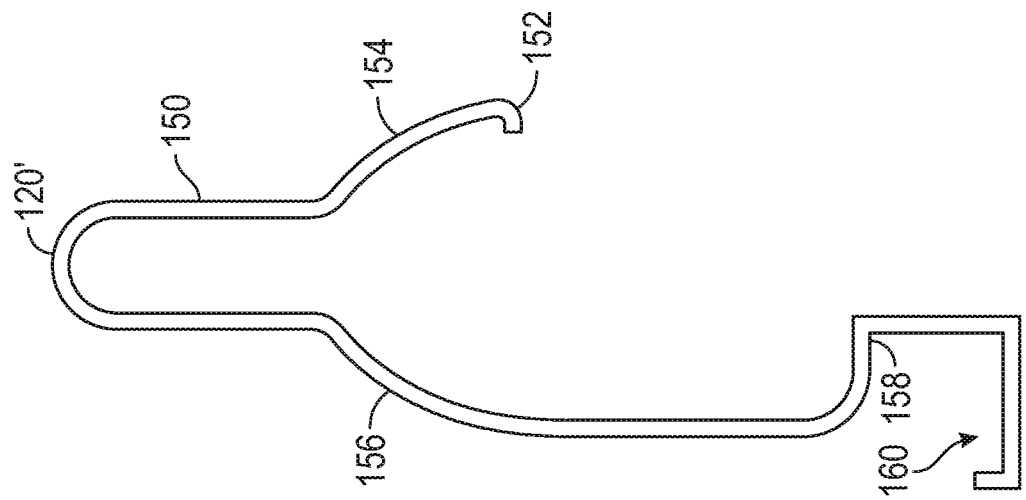
FIG. 6 is an end view in elevation of a modified cable manager member.

FIG. 6 is a cross-sectional view in elevation of a modified cable manager member 120'. The cable manager member 120' has the same general profile as the cable manager member 120, including the extension 150, the end 152 and the segments 154 and 156, but terminates in a hook 160 or cable receiver that extends from approximately the position of the inner end 158 in the implementations described above. The hook 160 is configured to hold one or more loops of cable F (not shown).

Figure 7:
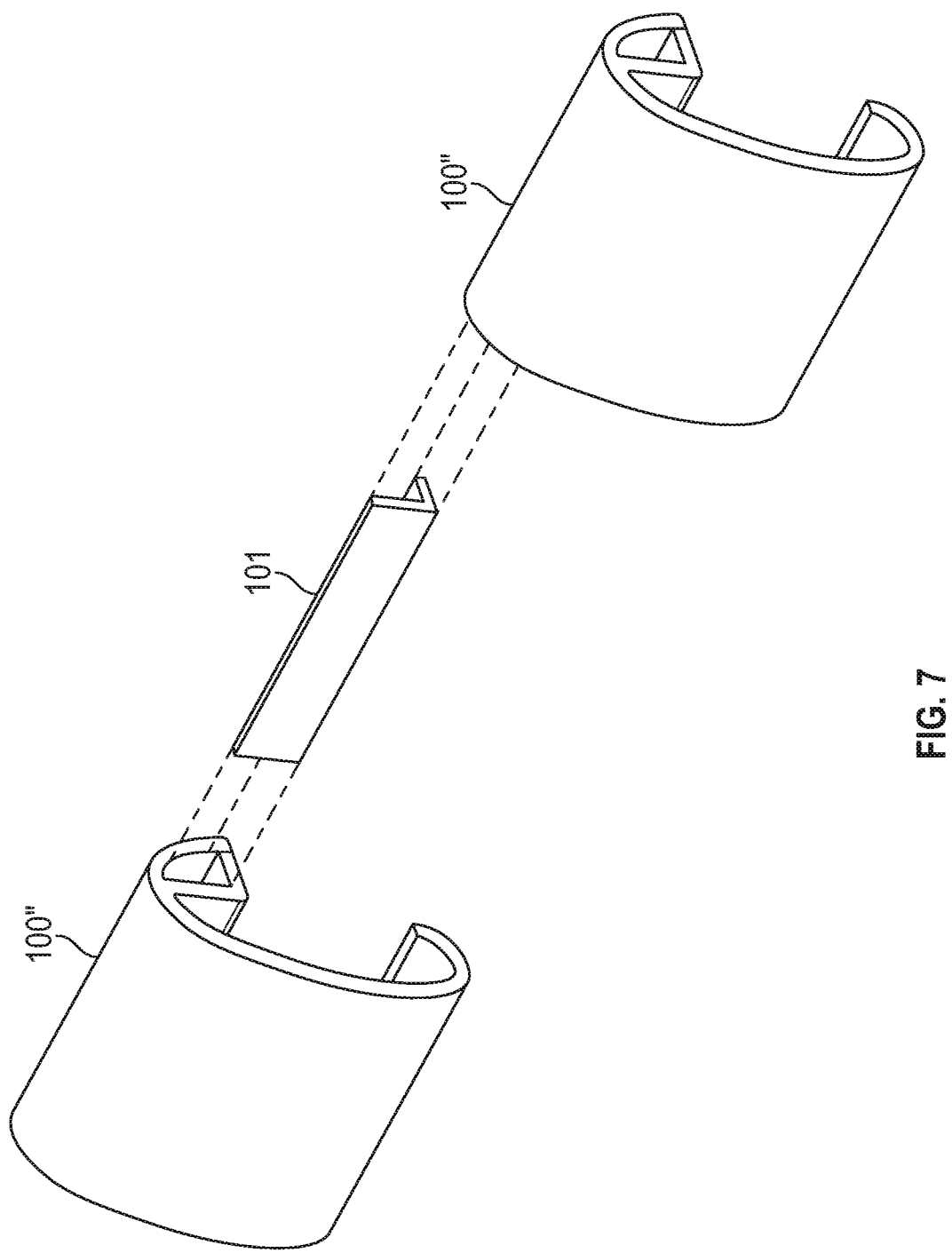
FIG. 7 is a perspective view of a first guide member positioned for being joined to a second guide member with a junction member.

FIG. 7 is a perspective view of two guide members having any desired lengths being joined to each other in an end-to-end configuration. For example, two guide members 100", 100," which each have an enclosed outer portion, can be joined together with a junction member 101 having a cross-section shaped to fit within the respective enclosed outer portions. The guide members 100" can be pushed together and maintained in place by the junction member 101 to create a single, continuous guiding surface of a desired overall length.

In some of the described implementations, the cable F is fiber optic cable and the tray T is a tray for fiber optic cable. In other described implementations, the cable F can be another type of electrical or communications cable or wire, including, e.g., copper wire cable. In all cases, the contoured guide surface 110 is shaped to maintain the cable or wire within any prescribed configuration, such as not being subjected to any bend radius smaller than a prescribed radius for the given type of cable or wire. As one example, the contoured guide surface 110 can be configured to assist in maintaining fiber optic cable along the guide path in a configuration that does not include any bend radius that is smaller than ten times or fifteen times the diameter of the cable.

As described, in some implementations, one or more components, such as the guide member and/or the cable manager member, can have a substantially uniform cross-section. As a result, these components can be formed by an extrusion process or other method that takes advantage of the uniform cross-section, also sometimes referred to as a fixed cross-sectional profile. Thus, the guide member and/or the cable manage member can be described as being extrudable, or continuously extrudable or having an extrudable profile or shape. In addition, the guide member and/or the cable manager member in some implementations has a single piece construction.

Suitable materials for the guide member and the cable manager member include ABS, PVC and other similar plastic material. Other materials could also be used.

In an extrusion process, material is pushed through a die of the desired cross-section. Advantages of extrusion over other manufacturing processes are the ability to create very complex cross-sections, to work materials that are brittle (because the materials only encounter compressive and shear stresses) and to easily make products having the same cross-section but in different lengths. Extrusion also tends to form parts having an excellent surface finish.

An extrusion process for plastic material typically uses plastic chips or pellets, which are usually first dried in a hopper before being fed with a feed screw. A polymer resin is heated to a molten state by a combination of heating elements and shear heating from an extrusion screw. The extrusion screw (or screws) forces the resin through a die, forming the resin into the desired shape. The product of the extrusion, called "extrudate," is cooled and solidified as it is pulled through the die or water tank.

A "caterpillar haul-off" (called a "puller" in the U.S.) cab be used to provide tension on the extrusion line, which can improve overall quality of the extrudate (tension can also be applied at other points in the process). In some processes, the extrudate is pulled through a very long die, in a process called "pultrusion." A multitude of polymers is used in the production of various types of plastic tubing, pipes, rods, rails, seals, and sheets or films, as some examples.

Drawing, which uses the tensile strength of the material to pull it through the die, is a similar process to extrusion. In general, a drawing process is more limited in the amount of change to the starting cross-section that can be completed in one step, so it is limited to simpler shapes, and multiple stages are usually needed. Metal bars and tubes, as well as wire, are also often drawn.

Extrusion may be continuous (theoretically producing indefinitely long material) or semi-continuous (producing many pieces). The extrusion process can be done with hot starting material or cold starting material. In addition to plastics, commonly extruded materials include metals, polymers, ceramics, concrete and modelling clay, as some examples.

Also referred to as "hole flanging," hollow cavities within extruded material cannot be produced using a simple flat extrusion die, because there would be no way to support the center barrier of the die. Instead, the die assumes the shape of a block with depth, beginning first with a shape profile that supports the center section. The die shape then internally changes along its length into the final shape, with the suspended center pieces supported from the back of the die. The material flows around the supports and fuses together to create the desired closed shape.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

What is claimed is:

1. A cable management assembly for guiding cable arranged in a tray, comprising:
   a guide member having a mounting region shaped to receive a portion of a side of the tray to mount the guide member to the tray, the guide member having a contoured guiding surface forming at least part of an outer surface thereof, wherein when the guide member is mounted to the side of the tray, the contoured guiding surface defines at least one guide path for cable extending from an interior of the tray, over the contoured guiding surface and to an exterior of the tray; and
   a cable manager member having a body with a mounting region shaped to fit around at least a portion of the contoured guide surface of the guide member to mount the cable manager member to the guide member, the cable manager member having an extension that extends away from the body and against which cable can be guided, wherein the cable manager member is adjustably mountable along a length of the guide member to position the extension adjacent the guide path.

2. The cable management assembly of claim 1, wherein the guide member has a uniform cross-section in the longitudinal direction.

3. The cable management assembly of claim 1, wherein the cable manager member has a uniform cross-section in the longitudinal direction.

4. The cable management assembly of claim 1, wherein the mounting region of the cable manager member is resilient to allow the cable manager member to be deformed and then relaxed for mounting the cable manager member to the guide member.

5. The cable management assembly of claim 1, wherein at least one of the guide member and the cable manager member is extrudable in desired lengths from a plastic material.

6. The cable management assembly of claim 1, wherein the cable manager member comprises at least one hook dimensioned to receive at least one length of the cable.

7. The cable management assembly of claim 1, wherein the mounting region of the guide member comprises at least one leg shaped to contact a side of the tray when the guide member is mounted to the tray.

8. The cable management assembly of claim 1, wherein the guide member is a first guide member, further comprising a second guide member and a junction member with first and second ends insertible in the first guide member and the second guide member, respectively, to join the first and second guide members together.

9. A guide member for guiding cable over a side of a cable tray, comprising:
   a body having a longitudinal dimension, substantially parallel inner and outer surfaces extending longitudinally and a uniform cross-section over the longitudinal dimension,
   wherein the uniform cross-section comprises:
      a contoured guide surface defined over at least a portion of the outer surface;
      an inwardly curved first end dimensioned to contact an interior side of the tray at a first height when the guide member is mounted to the tray;
      a second end configured to be spaced away from an exterior side of the tray when the guide member is mounted to the tray, thereby defining an outer end of the contoured guide surface that is spaced outwardly from the exterior side of the tray at a second height above the first height;
      a mounting region formed in the body between the first and second ends and on the inner surface opposite the contoured guide surface, the mounting region having a recess extending longitudinally and dimensioned to receive the tray; and
      a leg extending tangentially away from a base of the recess, wherein the leg is configured to contact the exterior side of the tray when the guide member is mounted to the tray with the tray received in the recess.

10. The guide member of claim 9, wherein the guide member is formed as single piece construction.

11. The guide member of claim 9, wherein the leg is a first leg, further comprising a second leg extending parallel to and spaced apart from the first leg, and wherein the second leg is configured to contact the interior side of the tray when the guide member with the side of the tray received between the first leg and the second leg.

12. The guide member of claim 9, wherein when viewing the uniform cross-section, the contoured guide surface has an inverted U shape configured to be centered over the side of the tray.

13. The guide member of claim 9, wherein when viewing the uniform cross-section, the second end comprises a support section extending from the second end and connecting to the leg, thereby forming an enclosed area in the uniform cross-section.

14. The guide member of claim 9, wherein the body is formed as a single piece by extrusion.

15. The guide member of claim 9, wherein the guide member comprises a recess for receiving a junction member configured to join the guide member end-to-end with another guide member.

* * * * *